US012573942B2

(12) United States Patent
Duan et al.

(10) Patent No.: US 12,573,942 B2
(45) Date of Patent: Mar. 10, 2026

(54) DISTRIBUTED PHASE-SHIFTING TRANSFORMING POWER SUPPLY SYSTEM

(71) Applicant: EATON INTELLIGENT POWER LIMITED, Dublin (IE)

(72) Inventors: Jiajie Duan, Shanghai (CN); Jianxiong Yu, Shanghai (CN); Qiang Chen, Shanghai (CN); Cheng Luo, Shanghai (CN); Han Li, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 263 days.

(21) Appl. No.: 18/323,080

(22) Filed: May 24, 2023

(65) Prior Publication Data

US 2023/0386738 A1      Nov. 30, 2023

(30) Foreign Application Priority Data

May 31, 2022    (CN) .......................... 202210610566.0

(51) Int. Cl.
*H02M 1/12*          (2006.01)
*H01F 30/14*         (2006.01)
*H02M 7/219*         (2006.01)

(52) U.S. Cl.
CPC ............. *H02M 1/12* (2013.01); *H02M 7/219* (2013.01); *H01F 30/14* (2013.01)

(58) Field of Classification Search
CPC ......... H02M 1/12; H02M 7/219; H01L 30/12; H01L 30/14; H01F 30/12; H01F 30/14
See application file for complete search history.

(56) References Cited

U.S. PATENT DOCUMENTS

| | | | | |
|---|---|---|---|---|
| 6,229,722 B1 * | 5/2001 | Ichikawa | ................ | H02M 7/49 |
| | | | | 363/71 |
| 2011/0187484 A1 * | 8/2011 | Owen | ..................... | H01F 30/12 |
| | | | | 29/605 |
| 2014/0015629 A1 * | 1/2014 | Zeng | ........................ | H01F 30/14 |
| | | | | 336/5 |

FOREIGN PATENT DOCUMENTS

| | | | | |
|---|---|---|---|---|
| CN | 209659176 U | * | 11/2019 | |
| CN | 114465494 A | * | 5/2022 | ............. H02M 1/12 |
| RU | 151148 U1 | * | 3/2015 | |

* cited by examiner

*Primary Examiner* — Jue Zhang
(74) *Attorney, Agent, or Firm* — Stanek Lemon Crouse & Meeks, PA

(57)                ABSTRACT

The present disclosure provides a distributed phase-shifting transforming apparatus, including N transformer rectifier units, where each transformer rectifier unit includes two three-phase three-winding transformers and four rectifier circuits, each three-phase three-winding transformer includes first windings on the primary side and second windings and third windings on the secondary side, AC power output by the second windings and the third windings on the secondary side is output after being rectified by the rectifier circuits. Each transformer rectifier unit is configured such that: one set of the two first windings on the primary side and the two second windings on the secondary side is phase-shifted by 15° from each other, and the other set has the same phase angle; and the second windings and the third windings of each three-phase three-winding transformer are phase-shifted by 30° from each other.

13 Claims, 7 Drawing Sheets

DISTRIBUTED PHASE-SHIFTING TRANSFORMING POWER SUPPLY SYSTEM

CROSS-REFERENCE TO RELATED APPLICATIONS

The present application claims priority to Chinese Patent Application No. 202210610566.0; Filed May 31, 2022, entitled DISTRIBUTED PHASE-SHIFTING TRANS-FORMER POWER SUPPLY SYSTEM that is incorporated herein by reference in its entirety.

TECHNICAL FIELD

The present disclosure relates to the field of electronic power, and in particular to a distributed phase-shifting transforming power supply system.

BACKGROUND

With the rapid development of advanced technologies in the field of communication such as artificial intelligence and cloud computing, the scale of data centers used to store massive data is also growing rapidly. The data center imposes higher requirements for integrated power management, which makes the high voltage DC (HVDC) power supply system with high efficiency and low energy consumption popular. Compared with the conventional AC power supply system, the HVDC power supply system reduces the number of power conversion stages, improves the power density and efficiency, and reduces the size.

FIG. 1 is a schematic diagram of a commonly used centralized HVDC power supply system in the existing technology. As shown in FIG. 1, a main circuit of the H1 VDC power supply system includes a single phase-shifting rectifier transformer 10. The phase-shifting transformer 10 is a centralized phase-shifting transformer, including a single winding 101 on the primary side and a plurality of windings 102 on the secondary side, where the single winding 101 on the primary side receives three-phase AC mains electricity, and the plurality of windings 102 on the secondary side have a series of phase angles staggered from one another in different winding methods. A three-phase output terminal of each winding 102 is respectively connected to a three-phase input terminal of a corresponding three-phase AC-DC conversion module 11, and all positive and negative output terminals of the three-phase AC-DC conversion module 11 are connected in parallel to positive and negative DC buses 12 as the output of the HVDC power supply system. The phase-shifting transformer can better suppress the pollution of harmonics to a power grid. However, the centralized phase-shifting transformer in the existing technology is a single transformer, with insufficient safety redundancy, and once a fault occurs, the whole transformer will fail. In addition, due to the large number of windings on the secondary side and the need for phase-shift winding between them, the winding process is complex and the winding density is high, resulting in high cost. And it is less likely to be in common use or expanded after being finalized and produced, and the system capacity cannot be easily increased.

SUMMARY

To solve the above technical problems in the existing technology, in one aspect, the present disclosure provides a distributed phase-shifting transforming apparatus, including N transformer rectifier units, where N is greater than or equal to 1, each transformer rectifier unit includes two three-phase three-winding transformers and four rectifier circuits, each three-phase three-winding transformer includes first windings on the primary side and second windings and third windings on the secondary side, where the two first windings are connected in parallel to a three-phase AC input, the two second windings and the two third windings are respectively connected to a corresponding one of the four rectifier circuits, and positive and negative DC output terminals of the four rectifier circuits are respectively connected to positive and negative DC buses, where each of the transformer rectifier units is configured such that a phase angle difference between the two first windings is 15° and a phase angle of the two second windings is the same, or a phase angle difference between the two second windings is 15° and a phase angle of the two first windings is the same; and in each of the three-phase three-winding transformers, a phase angle difference between the second winding and the third winding is a preset angle.

In one embodiment, N is greater than or equal to 2, and phase angles of two first windings of the $N^{th}$ transformer rectifier unit are respectively 15°/N different from phase angles of two corresponding first windings of the $(N-1)^{th}$ transformer rectifier unit.

In one embodiment, 2N first windings of the N transformer rectifier units are in zigzag connection, 2N second windings are in star connection, and 2N third windings are in delta connection; or 2N first windings of the N transformer rectifier units are in zigzag connection, 2N second windings are in delta connection, and 2N third windings are in star connection.

In one embodiment, 2N first windings of the N transformer rectifier units are all in delta connection or star connection, and 2N second windings are in zigzag connection; and in each three-phase three-winding transformer, the third windings are in zigzag connection different from that of the corresponding second windings so that the preset angle is 30°.

In one embodiment, the distributed phase-shifting transforming apparatus includes two transformer rectifier units, where the phase angles of the first windings are −7.5°, 0°, 7.5° and 15° respectively, the phase angle of the second windings is 0°, and the phase angle of the third windings is 30°.

In one embodiment, the distributed phase-shifting transforming apparatus includes two transformer rectifier units, where the phase angle of the first windings is 0°, the phase angles of the second windings are −7.5°, 0°, 7.5° and 15° respectively, and the phase angles of the third windings are −22.5°, 30°, 37.5° and 45° respectively.

In one embodiment, the first or second rectifier circuit is a three-phase full-controlled or uncontrolled bridge rectifier circuit.

In one embodiment, the three-phase bridge rectifier circuit is a three-phase uncontrolled bridge rectifier circuit comprising six diodes, where an output terminal of the three-phase uncontrolled bridge rectifier circuit is connected in parallel to a filter capacitor.

In one embodiment, the preset angle is 20° or 15°.

In one embodiment, a first switch is arranged between the first windings of each transformer rectifier unit and a three-phase mains electricity, and/or a second switch is arranged between the second windings and a first rectifier circuit, and/or a third switch is arranged between the third windings and a second rectifier circuit.

According to the distributed phase-shifting transformer rectifier circuit of the present disclosure, a plurality of three-winding transformers whose phase angles are differentially set in advance are used, so that current harmonics input into a power grid from the AC side are effectively reduced, and a power factor is increased. The simple structure of the three-winding transformer greatly reduces the complexity of the production process, thus reducing the cost and facilitating large-scale expansion. In addition, a plurality of three-winding transformers are distributed in the apparatus, and the failure of any transformer does not affect the operation of the system, so the safety redundancy is high and the maintenance cost is lower.

BRIEF DESCRIPTION OF THE DRAWINGS

Embodiments of the present disclosure are further described below with reference to the accompany drawings, in which.

DETAILED DESCRIPTION

In order to make the objectives, technical schemes, and advantages of the present disclosure clearer, the following further describes the present disclosure in detail below through embodiments of the present disclosure with reference to the accompanying drawings.

In the distributed phase-shifting transformer rectifier circuit according to various embodiments of the present disclosure, a plurality of multi-winding transformers having a simpler structure than a single centralized multi-winding transformer are used, such as a three-winding transformer with a mature production process and low cost. Every two three-winding transformers serve as a basic transformer unit, where relative phase-shifting phase angles of the two three-winding transformers are set according to a preset rule. On this basis, the distributed phase-shifting transformer according to the present disclosure may be configured to have one, two, three, four or more of the basic transformer units and relative phase-shifting phase angles of the plurality of basic transformer units are defined according to a preset rule. The distributed phase-shifting transformer formed by the plurality of basic transformer units forms a plurality of transformer paths but not a single transformer path between the mains electricity and the corresponding three-phase rectifier unit, and even if one of the three-winding transformers fails, other three-winding transformers are not affected. In addition, the inventor found that the configuration method of the phase-shifting angle of the centralized phase-shifting transformer in the existing technology is single. However the distributed phase-shifting transformer rectifier circuit according to the present disclosure can not only set an desired phase-shifting angle of the phase angle in the same three-winding transformer, but also can further set additional phase-shifting angle of the phase angles between different three-winding transformers of the same transformer unit. Further, another additional phase-shifting angle of the phase angle can be added between different transformer units. With the increase of the transformer units, a selection range of the configurable phase-shifting angle is also increased, so that the system can be quickly and correspondingly designed according to the requirements of harmonic elimination in any transformation scenario, with high application flexibility.

Figure 1:
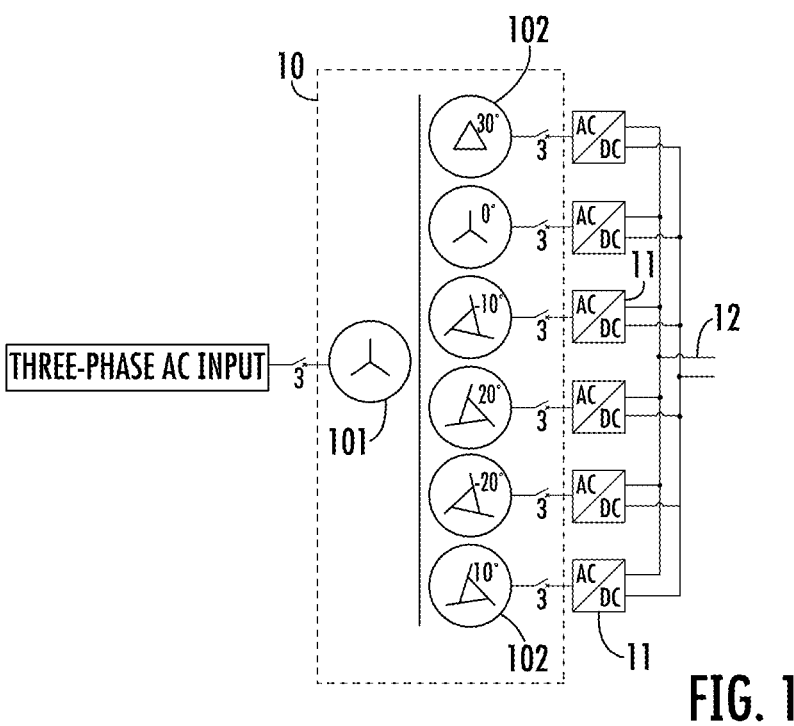
FIG. 1 is a schematic diagram of a commonly used centralized HVDC power supply system in the existing technology.
Figure 2:
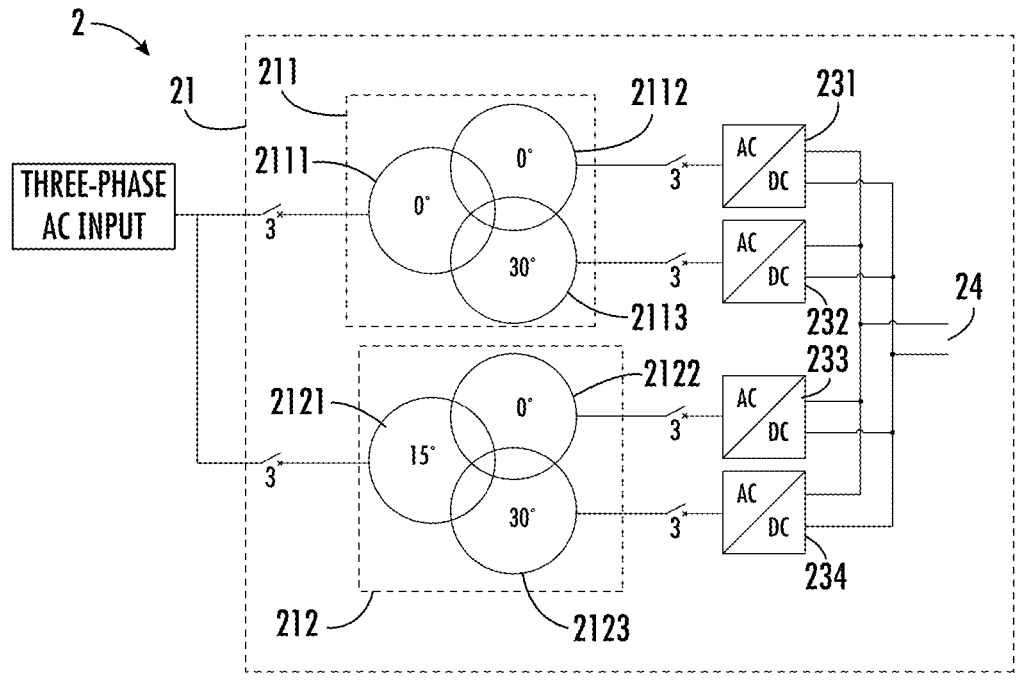
FIG. 2 shows a topology schematic diagram of a distributed phase-shifting transformer rectifier circuit according to a first embodiment of the present disclosure.

FIG. 2 shows a topology schematic diagram of a distributed phase-shifting transformer rectifier circuit according to a first embodiment of the present disclosure. The distributed phase-shifting transformer rectifier circuit 2 only includes one set of transformer unit 21, where the transformer unit 21 includes two three-winding transformers 211 and 212 and four three-phase rectifier units 231, 232, 233 and 234. The positive and negative output terminals of the four three-phase rectifier units are respectively connected to positive and negative DC buses 24 serving as the outputs of the distributed phase-shifting transformer rectifier circuit 2.

The first three-winding transformer 211 includes a first winding 2111 on the primary side, a second winding 2112 on the secondary side, and a third winding 2113 on the secondary side. The second three-winding transformer 212 includes a first winding 2121 on the primary side, a second winding 2122 on the secondary side, and a third winding 2123 on the secondary side. The first windings 2111 and 2121 each have three input terminals to respectively receive three-phase AC mains electricity through three-phase AC switches. The second windings 2112, 2122 and the third windings 2113, 2123 each have three output terminals to output the transformed three-phase AC mains electricity through the three-phase AC switches to the correspondingly connected three-phase rectifier units 231, 232, 233 or 234.

As shown in FIG. 2, for each three-winding transformer 211 or 212, the third winding on the secondary side is arranged to be fixedly phase-shifted by 30° relative to the second winding on the secondary side (for example, the third winding 2113 is phase-shifted by 30° relative to the second winding 2112). Those having ordinary skill in the art will know that, according to the phase shifting principle of the multiplex rectifier circuit, based on a specific phase shift angle, a specific high-frequency harmonic component other than the fundamental wave in the AC input current of any phase on the primary side can be effectively eliminated while the secondary side of the transformer supplies power to the load. For example, in the distributed phase-shifting transformer rectifier circuit as shown in FIG. 2, the phase angle difference of 30° enables the $5^{th}$ and $7^{th}$ harmonics of the AC input current of each phase on the primary side can be effectively eliminated, and the power factor is improved.

For the transformer unit 21 composed of the three-winding transformers 211 and 212, the two three-winding transformers are arranged to be phase-shifted relative to each other by a certain angle (the phase angle can be obtained by calculating the target harmonic to be eliminated) to further eliminate other high-order harmonics. In an example, the first winding 2121 in this embodiment is phase-shifted by 15° relative to the first winding 2111, so that the $11^{th}$ and $13^{th}$ harmonics of the AC input current of each phase on the primary side can be effectively eliminated during the transformation.

Figure 3:
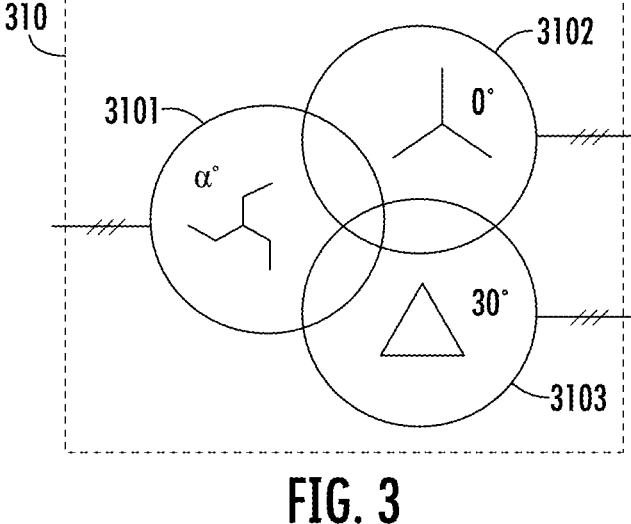
FIG. 3 shows an example of a winding of a three-winding transformer in a distributed phase-shifting transformer rectifier circuit according to the first embodiment shown in FIG. 2.

FIG. 3 shows an example of a winding of the three-winding transformer according to the first embodiment shown in FIG. 2. The first winding 3101 on the primary side of each three-winding transformer 310 is in zigzag connection, and the first windings of the two three-winding transformers of the same transformer unit are in different zigzag connections, so that the phase angles of the two are 0° and 15° respectively (that is, the values of a in FIG. 3 are 0° and 15°). The two second windings 3102 are in star connection, with a phase angle of 0°. The two third windings 3013 are in delta connection, with a phase angle of 30°.

In the second embodiment of the present disclosure according to this arrangement principle, the relative phase shift between the three-winding transformers 211 and 212 can also be configured to be achieved by the second windings 2112 and 2122. Specifically, in one exemplary configuration, the first windings 2111 and 2121 on the primary side are relatively unshifted, and the phase angles are both set to 0°; the second winding 2122 is phase-shifted by 15° relative to the second winding 2112, that is, the phase angle of the second winding 2112 is 0°, and the phase angle of the second winding 2122 is 15°. Since each third winding still needs to be phase-shifted by 30° relative to the second winding in the same three-winding transformer, the phase angle of the third winding 2113 is 30° (that is, an increase of 30° in the phase angle of the second winding 2112), while the phase angle of the third winding 2123 is 45° (that is, an increase of 30° in the phase angle of the second winding 2122).

Figure 4:
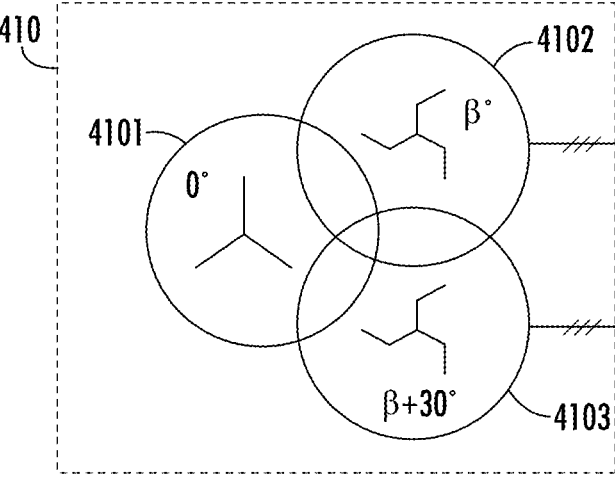
FIG. 4 shows an example of a winding of a three-winding transformer in a distributed phase-shifting transformer rectifier circuit according to a second embodiment of the present disclosure.

FIG. 4 shows an example of a winding of a three-winding transformer of the second embodiment of the present disclosure. A first winding 4101 on the primary side of each three-winding transformer 410 is in star connection, with a phase angle of 0°. Second and third windings 4102 and 4103 on the secondary side are in zigzag connection. The phase angles of the two second windings are 0° and 15° respectively by using different zigzag connections in the two second windings (that is, β is 0° and 15° in FIG. 4), and the phase angles of the two third windings are 30° and 45° respectively by using different zigzag connections in the two third windings.

Figure 5:
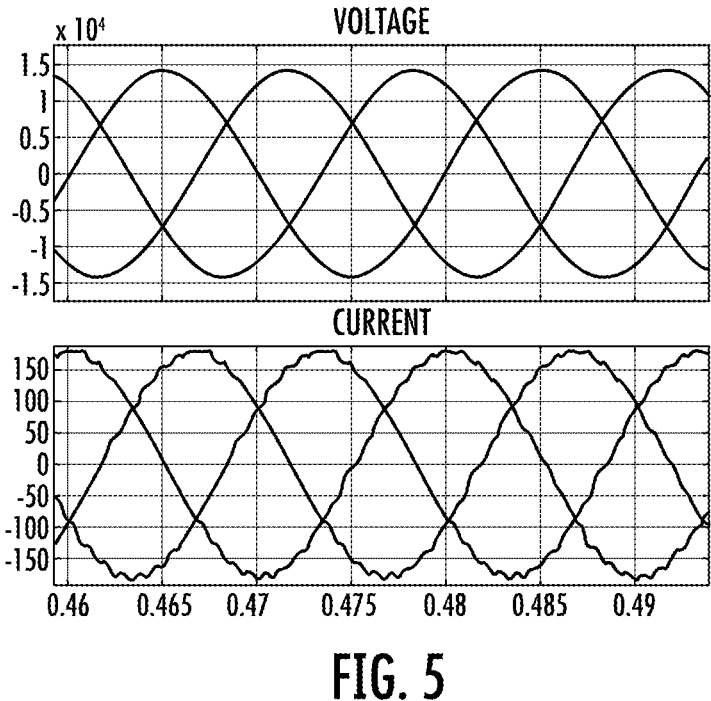
FIG. 5 shows simulation results of the voltage and current at a three-phase AC input terminal on a secondary side of the distributed phase-shifting transformer rectifier circuit according to the first embodiment.

The upper and lower sides of FIG. 5 respectively show simulation results of the voltage and current at a three-phase AC input terminal on a secondary side of the distributed phase-shifting transformer rectifier circuit according to the first embodiment. It can be learned from the simulation that the distortion of the current waveform on the AC side has been suppressed to a very small extent, which is basically close to the sinusoidal waveform shape of the corresponding voltage waveform.

Figure 6:
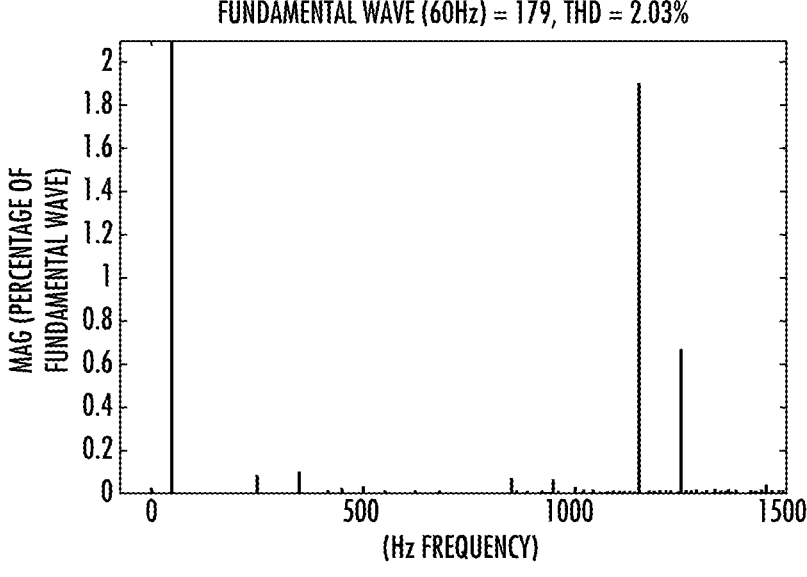
FIG. 6 shows a harmonic frequency ratio displayed in the frequency domain after Fourier Transform of the current waveform of the three-phase AC input terminal on the secondary side shown in FIG. 5.

FIG. 6 shows a harmonic frequency ratio displayed in the frequency domain after Fourier Transform of the current waveform of the three-phase AC input terminal on the secondary side shown in FIG. 5. From the frequency distribution, based on the power frequency of 50 Hz, the total harmonic distortion THD of the current is 2.03%.

Figure 7:
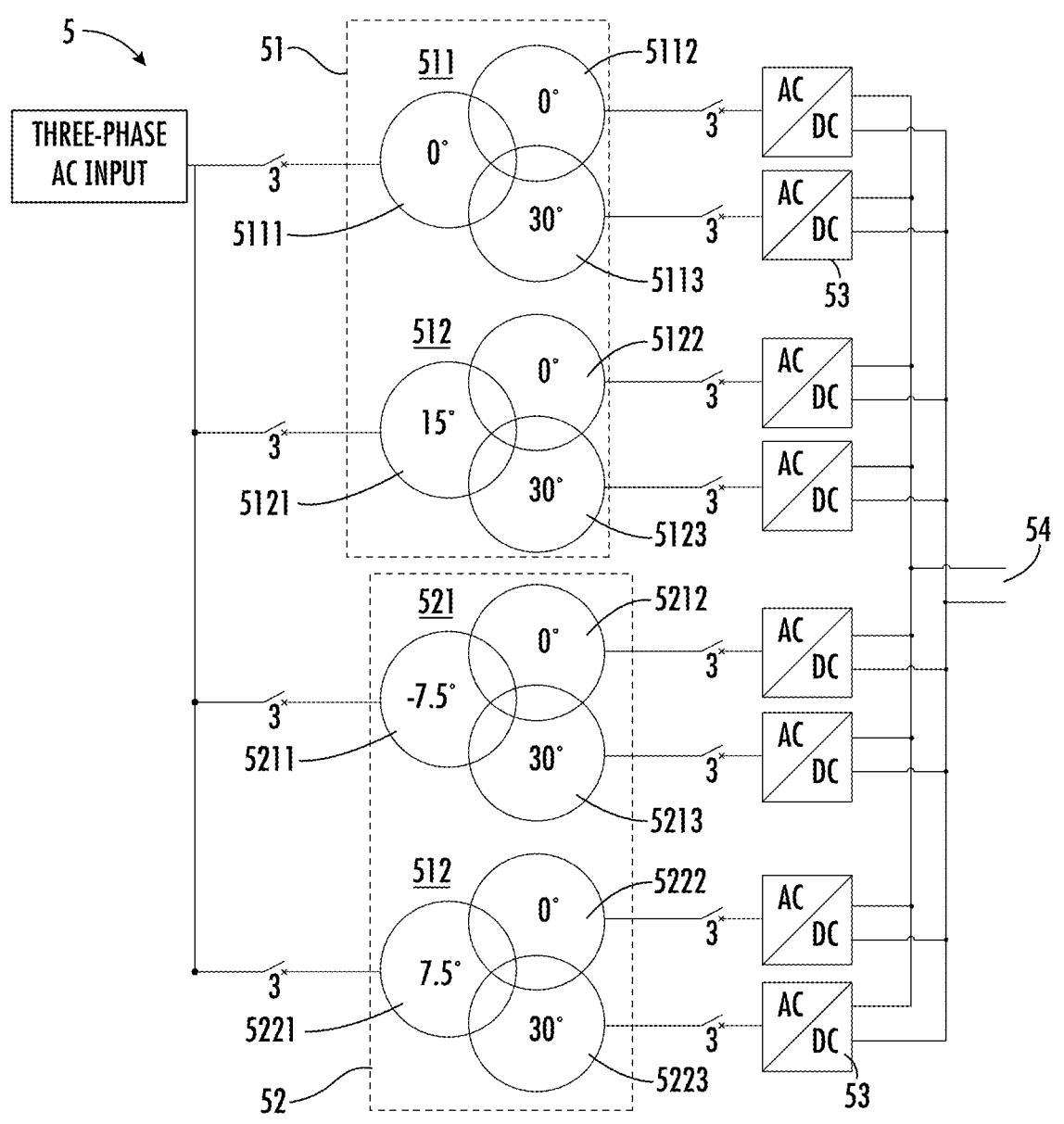
FIG. 7 shows a topology schematic diagram of a distributed phase-shifting transformer rectifier circuit according to a third embodiment of the present disclosure.

FIG. 7 shows a topology schematic diagram of a distributed phase-shifting transformer rectifier circuit according to a third embodiment of the present disclosure. Different from the distributed phase-shifting transformer rectifier circuit 2 shown in FIG. 2, the distributed phase-shifting transformer rectifier circuit 5 shown in FIG. 7 includes two transformer units, namely, a first transformer unit 51 and a second transformer unit 52, where the first transformer unit 51 includes two three-winding transformers 511 and 512, and the second transformer unit 52 includes two three-winding transformers 521 and 522.

The first transformer unit 51 includes three-winding transformers 511 and 512. The three-winding transformer 511 includes a first winding 5111 on the primary side, and a second winding 5112 and a third winding 5113 on the secondary side. The three-winding transformer 512 includes a first winding 5121 on the primary side, and a second winding 5122 and a third winding 5123 on the secondary side. The phase angle configuration and structure of the first transformer unit 51 are basically the same as those of the transformer unit 21 described in the first embodiment. Details are not described herein again.

For each of the three-winding transformers 511, 512, 521, and 522, the phase angles of the second windings and third windings on the secondary side are configured to be 0° and 30°, respectively, so that the $5^{th}$ and $7^{th}$ harmonics of the AC input current of each phase on the primary side can be effectively eliminated during the transformation.

The second transformer unit 52 includes three-winding transformers 521 and 522. The three-winding transformer 521 includes a first winding 5211 on the primary side, and a second winding 5212 and a third winding 5213 on the secondary side. The three-winding transformer 522 includes a first winding 5221 on the primary side, and a second winding 5222 and a third winding 5223 on the secondary side. The phase angles of the first windings 5211 and 5221 are configured to be −7.5° and 7.5°, respectively, and the two are phase-shifted by 15° relative to each other, so that the $11^{th}$ and $13^{th}$ harmonics of the AC input current of each phase on the primary side can be effectively eliminated during the transformation.

For the first transformer unit 51, the phase angles of the first winding 5111 and 5121 are configured to be 0° and 15°, respectively, so that an equivalent phase angle of the first transformer unit 51 is 7.5°, an average value of the two. For the second transformer unit 52, the phase angles of the first windings 5211 and 5221 are configured to be −7.5° and 7.5°, respectively, so that an equivalent phase angle of the second transformer unit 52 is 0°, an average value of the two. It can be learned that the respective equivalent phase angles of the first and second transformer units 51 and 52 differ by 7.5°. In this configuration, the $17^{th}$ and $19^{th}$ harmonics of the AC input current of each phase on the primary side can be effectively eliminated during the transformation.

The two windings on the secondary side of each of the first transformer unit 51 and the second transformer unit 52 are each rectified by three-phase rectifier units 53 (a total of eight three-phase rectifier units 53 are shown in the figure) and output DC power to positive and negative DC buses 54.

Figure 8:
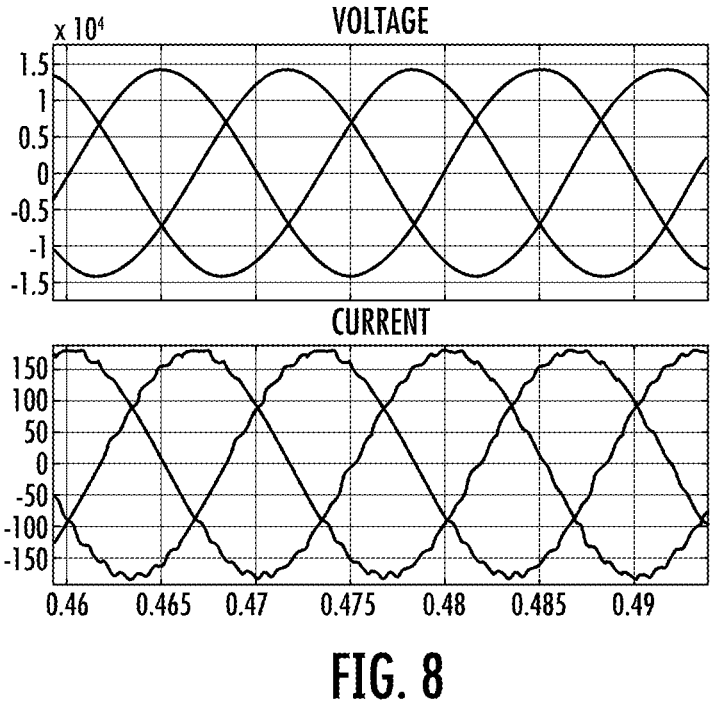
FIG. 8 shows simulation results of the voltage and current at a three-phase AC input terminal on a secondary side of the distributed phase-shifting transformer rectifier circuit according to the third embodiment.

The upper and lower sides of FIG. 8 respectively show simulation results of the voltage and current at a three-phase AC input terminal on a secondary side of the distributed phase-shifting transformer rectifier circuit according to the third embodiment. The simulation shows that the distortion of the current waveform on the AC side is suppressed to be smaller than the distortion of the current waveform on the AC side shown in FIG. 5.

Figure 9:
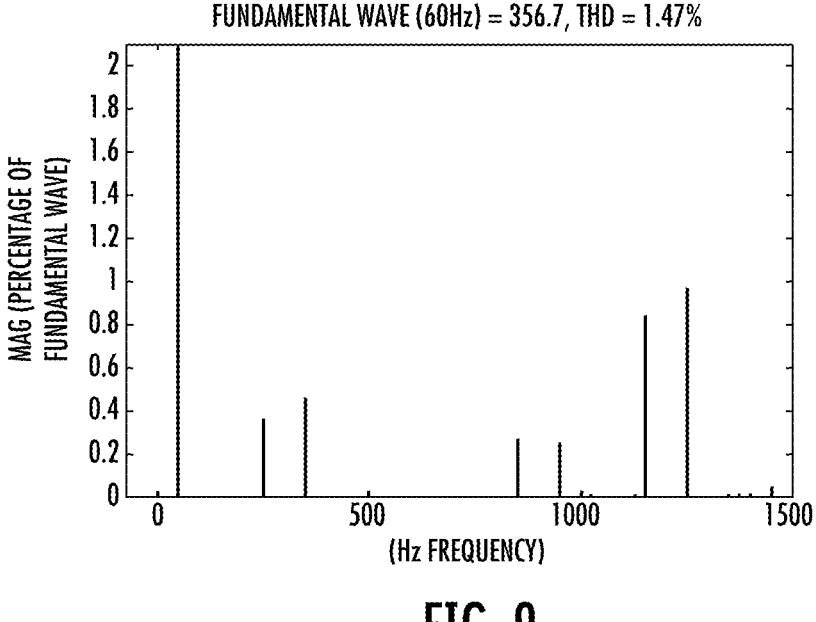
FIG. 9 shows a harmonic frequency ratio displayed in the frequency domain after Fourier Transform of the current waveform of the three-phase AC input terminal on the secondary side shown in FIG. 8.

FIG. 9 shows a harmonic frequency ratio displayed in the frequency domain after Fourier Transform of the current of the three-phase AC input terminal on the secondary side shown in FIG. 8. The calculated total harmonic distortion THD of the current is 1.47%.

In a fourth embodiment according to the present disclosure, the distributed phase-shifting transformer rectifier circuit 5 of the third embodiment shown in FIG. 7 may have another variation, in which the relative phase angle of the first winding on the primary side of each three-winding transformer remains unchanged, and the relative difference of the first phase angle across the transformers is realized only by a series of difference configurations of the phase angle of the second winding on the secondary side, and the relative difference of the second phase angle in the same transformer is realized by the fixed difference of the second winding and the third winding on the secondary side. For example, the phase angles of all the first windings of the transformer units 51 and 52 are 0°, the phase angles of the second windings 5112 and 5122 of the first transformer unit 51 are configured to be 0° and 15°, and the phase angles of the second windings 5212 and 5222 of the second transformer unit 52 are sequentially configured to be −7.5° and 7.5°. The third winding in the same three-winding transformer are all added with a phase shift angle of 30° on the phase angle of the second winding, so that the phase angles of the third winding 5113, 5123, 5213 and 5223 are 30°, 45°, 22.5°, and 37.5° respectively. In this configuration, the $5^{th}$, $7^{th}$, $11^{th}$, $13^{th}$, $17^{th}$ and $19^{th}$ harmonics can also be effectively eliminated.

In the distributed phase-shifting transformer rectifier circuit according to a fifth embodiment of the present disclosure, three transformer units are provided, where the phase angles of the windings of the first and second transformer units are identical to those of the third embodiment, and the first windings on the primary side of two three-winding transformers of the newly added third transformer unit are phase-shifted by −11.25° and 3.75°, respectively, so the relative difference between the two phase angles is 15°. The phase angle of the second winding of the third transformer unit is set to be 0°, and the phase angle of the third winding of the third transformer unit is set to be 30°. Since an equivalent phase angle of the third transformer unit is −3.75°, an average value of the phase angles of the two first windings, and the equivalent phase angle of the second transformer unit is 0°, the relative difference of the phase angles of the two units is 3.75°, and $23^{rd}$ and $25^{th}$ harmonics on the AC side can be effectively eliminated. In addition, a relative phase angle difference of 3.750 between the third transformer unit and the second transformer unit can also be formed by configuring differentiated phase angles of second winding on the secondary side in a manner similar to that of the fourth embodiment, which can also effectively eliminate the $23^{rd}$ and $25^{th}$ harmonics on the AC side. Therefore, according to the distributed phase-shifting transformer rectifier circuit described in this embodiment, the $5^{th}$, $7^{th}$, $11^{th}$, $13^{th}$, $17^{th}$, $19^{th}$, $23^{rd}$, and $25^{th}$ harmonics can be effectively eliminated.

Figure 10:
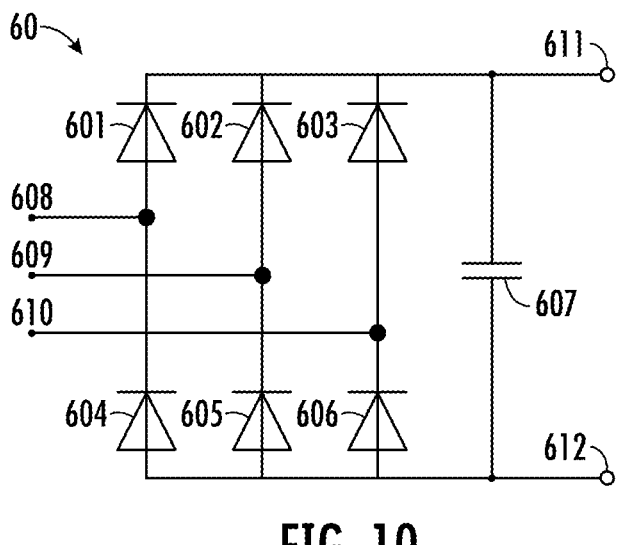
FIG. 10 exemplarily illustrates a schematic diagram of a three-phase rectifier unit in a distributed phase-shifting transformer rectifier circuit according to a sixth embodiment of the present disclosure.

FIG. 10 exemplarily illustrates a schematic diagram of a three-phase rectifier unit in a distributed phase-shifting transformer rectifier circuit according to a sixth embodiment of the present disclosure. FIG. 10 shows a three-phase uncontrollable rectifier circuit 60 composed of six diodes 601 to 606 and a capacitor 607, which has three input terminals 608 to 610 for receiving single-phase AC power respectively and two output terminals 611 and 612 for outputting positive and negative DC power respectively. The diodes 601 to 603 are connected to the common cathode and connected to the output terminal 611, the diodes 604 to 606 are connected to the common anode and connected to the output terminal 612. The anode of the diode 601 is connected to the cathode of the diode 604 and its connection node is connected to the input terminal 608, the anode of diode 602 is connected to the cathode of the diode 605 and its connection node is connected to the input terminal 609, and the anode of the diode 603 is connected to the cathode of the diode 606 and its connection node is connected to the input terminal 610. In other embodiments, the six diodes in the above three-phase rectifier circuit 60 can be respectively replaced with six thyristors with the same polarity, and a corresponding control circuit is configured and the capacitor 607 is removed to form a three-phase full-controlled bridge rectifier circuit. Similarly, other known three-phase rectifier circuits may be substituted for the circuit 60 without departing from the scope of the concept of the present disclosure.

Figure 11:
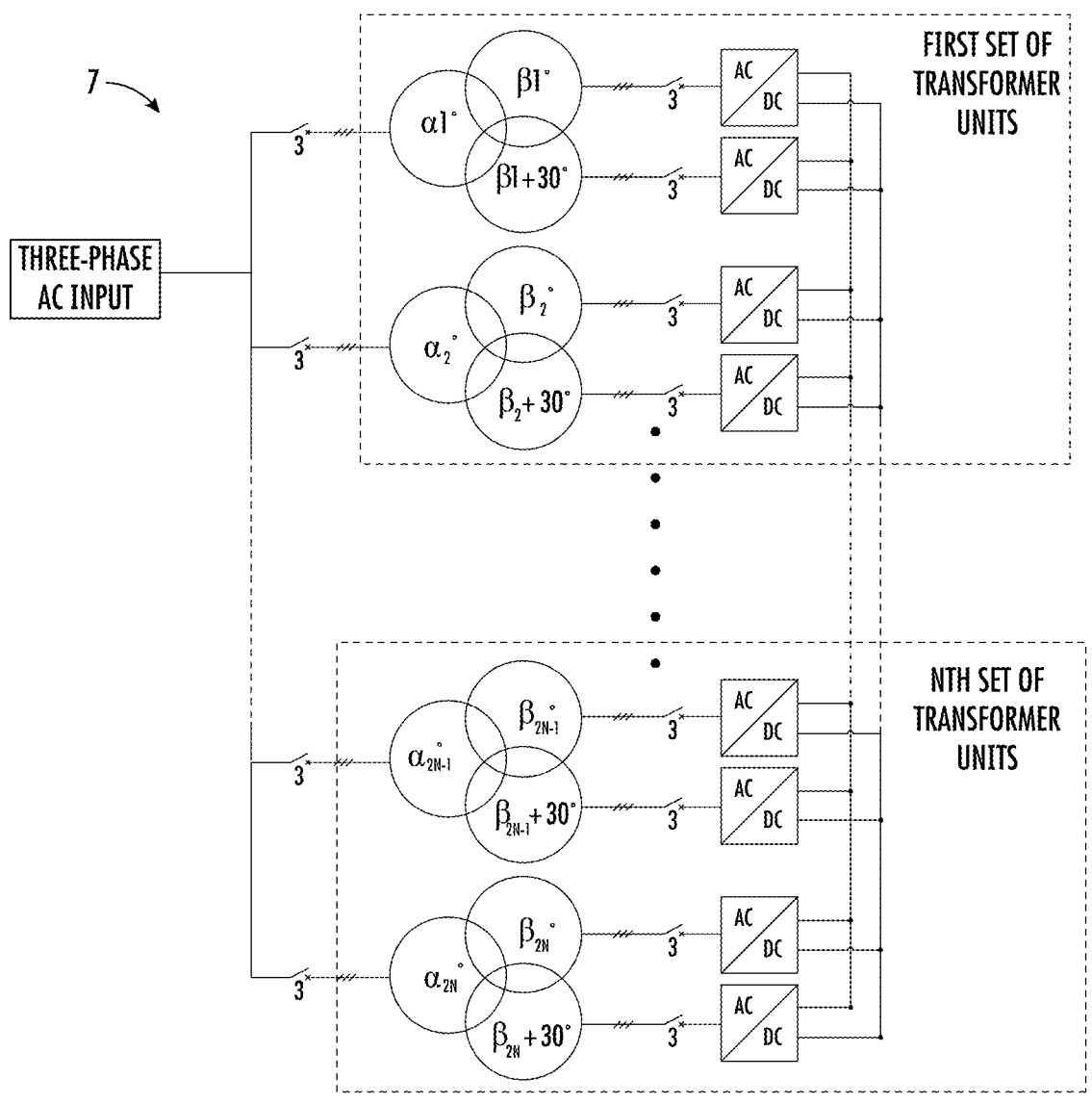
FIG. 11 shows a topology schematic diagram of a distributed phase-shifting transformer rectifier circuit according to another embodiment of the present disclosure.

FIG. 11 shows a topology schematic diagram of a distributed phase-shifting transformer rectifier circuit according to another embodiment of the present disclosure. The distributed phase-shifting transformer rectifier circuit 7 includes N sets of transformer units, and each transformer unit includes two three-winding transformers. The phase angle of the first winding on the primary side is represented by $\alpha°$ and the phase angle of the second winding on the secondary side is represented by $\beta°$. For the $N^{th}$ set of transformer units, the phase angles of the first windings are $\alpha_{2N}°$ and $\alpha_{2N-1}°$, respectively, the phase angles of the second windings are $\beta_{2N}°$ and $\beta_{2N-1}°$, respectively, and then the phase angles of the third windings are $\beta_{2N}°+30°$ and $\beta_{2N-1}°+30°$. For all the N sets of transformer units, only one of the phase angle $\alpha°$ of the first winding and the phase angle $\beta°$ of the second winding on the secondary side needs to be configured to be mutually staggered by a certain phase angle, while the other phase angle needs to be configured to be a constant, thereby obtaining a plurality of desired relative phase shift angles between the respective windings on the primary side and the secondary side, to eliminate current harmonics at the AC input on the primary side. The distributed phase-shifting transformer rectifier circuit 7 according to the inventive concept may be, for example, configured in the following two methods: (1). The phase angles $\alpha°$ of the first windings of all the N sets of transformer units are configured to be staggered (not overlapped) in sequence, and all $\beta°$ are equal. In this case, the phase angles $\alpha_{2N}°$ and $\alpha_{2N-1}°$ of the two first windings of the $N^{th}$ set of transformer units differ by 15°, and the phase angles of the two first windings of the $N^{th}$ set of transformer units can be obtained by carrying out the phase shift by 15°/N in the same direction on the phase angles $\alpha_{2(N-1)}°$ and $\alpha_{2(N-1)-1}°$ of the two first windings of the $(N-1)^{th}$ set of transformer units respectively. (2). The phase angles $\alpha°$ of the first windings of all the N sets of transformer units are equal, and the phase angles $\beta°$ of the second windings of all the N sets of transformer units are configured to be staggered (not overlapped) in sequence. In this case, the phase angles $\beta_{2N}°$ and $\beta_{2N-1}°$ of the two second windings of the $N^{th}$ set of transformer units differ by 15°, and the phase angles of the two second windings of the $N^{th}$ set of transformer units can be obtained by carrying out the phase shift by 15°/N in the same direction on the phase angles $\beta_{2(N-1)}°$ and $\beta_{2(N-1)-1}°$ of the two second windings of the $(N-1)^{th}$ set of transformer units respectively.

In another embodiment according to the present disclosure, the number and structure of the transformer rectifier units are similar to those of the first to fourth embodiments. In each three-phase three-winding transformer, the third winding on the secondary side can also be configured to be phase-shifted by 20° or 15° relative to the second winding.

Because the distributed phase-shifting transformer rectifier circuit in each embodiment of the present disclosure adopts a plurality of simple transformers with phase angles differentially set in advance, current harmonics input into a power grid from the AC side can be pertinently and effectively reduced, and the power quality is close to that of a centralized multi-winding transformer in the existing technology.

The distributed phase-shifting transformer rectifier circuit adopts the three-winding transformers, so that the complexity of a production process is greatly reduced, and the simple monomer structure also helps improve the stability of an overall system and the flexibility of the overall system in later expansion. For example, a plurality of three-winding transformers are combined into a plurality of transformer units according to a preset phase shift angle and are matched with each other to form multiple phase-shift, thereby eliminating harmonics of a specific frequency. Its total structure can be composed of eight or twelve or even more three-winding transformers, which has the performance advantage of modular expansion and can be configured into a super-large-scale cluster of transformers. In addition, the distributed arrangement of multiple three-winding transformers also has the inherent advantage of high degree of anti-risk redundancy. Even if one of the three-winding transformers fails, it still does not affect the other transformers to form an effective path between AC and DC sides. During maintenance, the smallest module that fails can be quickly replaced instead of replacing a single centralized transformer as a whole, so the maintenance cost is lower. It can be learned that it can strike a better balance between performance and cost.

Although the present disclosure has been described with reference to the preferred embodiments, the present disclosure is not limited to the embodiments described herein, and various changes and modifications may be made without departing from the scope of the present disclosure.

What is claimed:

1. A distributed phase-shifting transforming apparatus, comprising:

N transformer rectifier units, wherein N is greater than or equal to 2, wherein each transformer rectifier unit comprises two three-phase three-winding transformers and four rectifier circuits, wherein each three-phase three-winding transformer comprises first windings on a primary side and second windings and third windings on a secondary side, wherein two first windings are connected in parallel to a three-phase AC input, two second windings and the two third windings are connected to respective ones of the four rectifier circuits, and positive and negative DC output terminals of the four rectifier circuits are respectively connected to positive and negative DC buses, wherein each transformer rectifier unit is configured such that a phase angle difference between the two first windings is 15° and phase angles of the two second windings are the same or a phase angle difference between the two second windings is 15° and phase angles of the two first windings are the same, and wherein, in each of the three-phase three-winding transformers, a phase angle difference between the second winding and the third winding is a preset angle, wherein phase angles of two first windings of an $N^{th}$ transformer rectifier unit are respectively 15°/N different from phase angles of two corresponding first winding of an $(N-1)^{th}$ transformer rectifier unit.

2. The distributed phase-shifting transforming apparatus of claim 1, wherein: 2N first windings of the N transformer rectifier units are in a zigzag connection, 2N second windings are in star connection, and 2N third windings are in a delta connection; or 2N first windings of the N transformer rectifier units are in a zigzag connection, 2N second windings are in delta connection, and 2N third windings are in a star connection.

3. The distributed phase-shifting transforming apparatus of claim 2, wherein the distributed phase-shifting transforming apparatus comprises two transformer rectifier units, wherein the phase angles of the first windings are −7.5°, 0°, 7.5° and 15° respectively, the phase angle of the second windings is 0°, and the phase angle of the third windings is 30°.

4. The distributed phase-shifting transforming apparatus of claim 1, wherein: 2N first windings of the N transformer rectifier units are all in a delta connection or a star connection, and 2N second windings are in a zigzag connection; and in each three-phase three-winding transformer, the third windings are in a zigzag connection different from that of the corresponding second windings so that the preset angle is 300.

5. The distributed phase-shifting transforming apparatus of claim 4, wherein the distributed phase-shifting transforming apparatus comprises two transformer rectifier units, wherein the phase angle of the first windings is 0°, the phase angles of the second windings are −7.5°, 0°, 7.5° and 15°, respectively, and the phase angles of the third windings are −22.5°, 30°, 37.5° and 45°, respectively.

6. The distributed phase-shifting transforming apparatus of claim 1, wherein the first or second rectifier circuit is a three-phase full-controlled or uncontrolled bridge rectifier circuit.

7. The distributed phase-shifting transforming apparatus of claim 1, wherein the three-phase bridge rectifier circuit is a three-phase uncontrolled bridge rectifier circuit comprising six diodes, wherein an output terminal of the three-phase uncontrolled bridge rectifier circuit is connected in parallel to a filter capacitor.

8. The distributed phase-shifting transforming apparatus of claim 1, wherein the preset angle is 20° or 15°.

9. The distributed phase-shifting transforming apparatus of claim 1, wherein a first switch is arranged between the first windings of each transformer rectifier unit and a three-phase mains electricity, and/or a second switch is arranged between the second windings and a first rectifier circuit, and/or a third switch is arranged between the third windings and a second rectifier circuit.

10. The apparatus of claim 1, wherein the rectifier circuits are three-phase full-controlled or uncontrolled bridge rectifier circuits.

11. An apparatus comprising N transformer rectifier units, wherein each transformer rectifier unit comprises:

first and second transformers, each comprising a primary winding and first and second secondary windings, wherein the primary windings of the first and second transformers are coupled in parallel to an AC power source, wherein the primary winding of the second transformer is phase shifted with respect to the primary winding of the second transformer and wherein, for each of the first and second transformers, the first secondary winding is phase shifted with respect to the second secondary winding; and four rectifier circuits, wherein respective ones of the first and second secondary windings are coupled to inputs of respective ones of the rectifier circuits and wherein outputs of the rectifier circuits are coupled in parallel to a DC bus, wherein N is greater than or equal to 2, and wherein phase angles of the primary windings of an $N^{th}$ transformer rectifier unit are respectively 15°/N different from phase angles of corresponding ones of the primary windings of an $(N-1)^{th}$ transformer rectifier unit.

12. The apparatus of claim 11, wherein:

2N primary windings of the N transformer rectifier units are in a zigzag connection, 2N first secondary windings of the N transformer rectifier units in a star connection, and 2N second secondary windings of the N transformer rectifier units are in a delta connection; or 2N primary winding of the N transformer rectifier units are in a zigzag connection, 2N first secondary windings of the N transformer rectifier units are in delta connection, and 2N second secondary windings of the N transformer rectifier units are in a star connection.

13. The apparatus of claim 11, wherein:

2N primary windings of the N transformer rectifier units are all in a delta connection or a star connection and 2N first secondary windings of the N transformer rectifier units are in a zigzag connection; and in each transformer, the second secondary windings are in a zigzag connection different from that of the first secondary windings.

* * * * *